United States Patent [19]
Grobbauer et al.

[11] Patent Number: 6,127,040
[45] Date of Patent: Oct. 3, 2000

[54] ELECTROCERAMIC COMPONENT AND METHOD OF MANUFACTURE THEREOF

[75] Inventors: Peter Grobbauer; Günter Ott; Heinrich Zödl, all of Österreich, Germany

[73] Assignee: Siemens Matsushita Components GmbH & Co. KG, Munich, Germany

[21] Appl. No.: 09/242,779

[22] PCT Filed: Aug. 26, 1997

[86] PCT No.: PCT/DE97/01853

§ 371 Date: Feb. 22, 1999

§ 102(e) Date: Feb. 22, 1999

[87] PCT Pub. No.: WO98/09299

PCT Pub. Date: Mar. 5, 1998

[30] Foreign Application Priority Data

Aug. 26, 1996 [DE] Germany .................. 196 34 498

[51] Int. Cl.[7] ............................................ B32B 15/00
[52] U.S. Cl. ................. 428/432; 428/469; 428/472; 428/701; 428/702; 428/210; 427/100; 427/101; 427/102; 427/103
[58] Field of Search ..................... 428/432, 469, 428/472, 701, 702, 209, 210; 427/100, 101, 102, 103

[56] References Cited

U.S. PATENT DOCUMENTS

| | | |
|---|---|---|
| 3,496,512 | 2/1970 | Matsuoka et al. ............... 338/20 |
| 3,905,006 | 9/1975 | Matsuoka et al. . |
| 4,434,416 | 2/1984 | Schonberger ............... 338/22 |
| 4,480,376 | 11/1984 | Hakanson ................... 29/593 |
| 4,766,409 | 8/1988 | Mandai ..................... 338/22 |
| 4,786,888 | 11/1988 | Yoneda et al. ............... 338/22 |
| 5,072,329 | 12/1991 | Galvagni . |
| 5,195,019 | 3/1993 | Hertz . |
| 5,614,074 | 3/1997 | Ravindranathan ............ 205/50 |
| 5,750,264 | 5/1998 | Ueno ....................... 427/79 |

FOREIGN PATENT DOCUMENTS

WO 90/16074  6/1989  European Pat. Off. .

OTHER PUBLICATIONS

Patent Abstracts of Japan, vol. 096, No. 007, Jul. 31, 1996 & JP 08 064462 A.

*Primary Examiner*—Deborah Jones
*Assistant Examiner*—Jason D Resnick
*Attorney, Agent, or Firm*—Hill & Simpson

[57] ABSTRACT

Electroceramic component having a component body (10), connection metallization coatings (2, 3) and also a protective encapsulation (15 to 18) made of two different materials on in each case two mutually opposite areas of the component body (10) which are free from the connection metallization coatings (2, 3).

17 Claims, 1 Drawing Sheet

ELECTROCERAMIC COMPONENT AND METHOD OF MANUFACTURE THEREOF

The present invention relates to electroceramic components and also to a method production thereof.

An electroceramic component of this type is disclosed in WO-A-90 16074.

Electrical functional-ceramic components generally comprise a component body, which defines the component function and is made of functional ceramic, connection metallization coatings provided on said body, as well as a protective encapsulation on areas of the component body which are free from the connection metallization coatings. The term "functional ceramic" is in this case understood to mean active electroceramics, for example for electrical conductors. In the case of components of the type under discussion, which are suitable for SMD mounting, a generally parallelepipedal component body is provided in the case of which cap-shaped connection metallization coatings are provided on two mutually opposite ends. The surface regions of the component body which are free from these cap-shaped connection metallization coatings are provided with the protective encapsulation.

In the case of these components, the protective encapsulation serves to minimize surface influences in order to ensure a defined flow of current through the component. The protective encapsulation ensures better current division between the cap-shaped connection metallization coatings, improves the robustness and affords protection against surface reactions.

SUMMARY OF THE INVENTION

The present invention is based on at least one object of specifying a protective encapsulation of the type under discussion with which multilayer connection metallization coatings can be realized by means of standard electrodeposition conditions and the components provided with said connection metallization coatings can be employed in the range from low voltages up to power supply voltages.

This object is achieved by means of an electroceramic component that comprises a ceramic component body suitable for SMD mounting and which is parallelepiped shaped and which further comprises first and second pairs of opposing outer walls and two opposing ends. Each opposing end of the ceramic component body is coated with a connection metallization coating. The first pair of opposing outer walls is covered with a first protective encapsulation material; the second pair of opposing outer walls is covered with a second protective encapsulation material.

In an embodiment, the first protective encapsulation material comprises a laminate and the second protective encapsulation material comprises a high-resistance layer.

In an embodiment, the laminate is an insulating material.

In an embodiment, the laminate is selected from the group consisting of $BaTiO_3$, $SiO_2$ and $Al_2O_3$.

In an embodiment, the laminate is glass.

In an embodiment, the laminate is a high-resistance ceramic which is identical to the ceramic of the component body.

In an embodiment, the high-resistance layers are doped.

In an embodiment, the high-resistance layers each comprise an outer surface and the outer surfaces of the high-resistance layers are doped.

A method for producing a component according to the invention comprises the steps of providing a parallelepiped-shaped ceramic component body comprising first and second pairs of opposing outer walls and two opposing ends, providing two laminate sheets, providing two high-resistance sheets, covering each outer wall of the first pair of opposing outer walls with one of the laminate sheets, covering each outer wall of the second pair of opposing outer walls with one of the high-resistance sheets, and covering each of the opposing ends of the component with a connection metallization coating.

In an embodiment, the method further comprises the step of doping the high-resistance sheets near outer surfaces thereof with a conductive dopant.

In an embodiment, the doping of the high-resistance sheets is performed by impregnating the component body with an agent containing the dopant.

In an embodiment, the impregnation agent is a suspension containing the dopant.

In an embodiment, the impregnation agent is a solution containing the dopant.

In an embodiment, the dopant is applied to the component body by screen printing.

In an embodiment, the dopant is applied to the component body by rolling.

In an embodiment, the dopant is applied to the component by spraying.

In an embodiment, the component is sandwiched between laminate sheets and thereafter cut into two separate components prior to the covering the second pair of opposing outer walls with the high-resistance sheets.

In an embodiment, the method further comprises the step of sintering the component after the first pair of opposing outer walls is covered with the laminate sheets.

Other objects and advantages of the present invention will become apparent from reading the following detailed description and appended claims, and upon reference to the accompanying drawings.

BRIEF DESCRIPTION OF THE DRAWINGS

The invention is explained in more detail below using exemplary embodiments in accordance with the figures of the drawing, in which.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
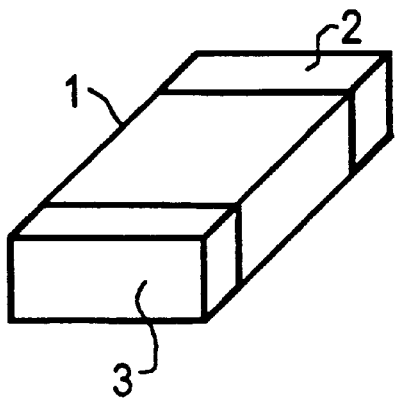
FIG. 1 is a diagrammatic perspective view of an electroceramic component suitable for SMD mounting.

In accordance with FIG. 1, an electroceramic component suitable for SMD mounting is formed by a parallelepipedal functional-ceramic component body 1 as well as cap-shaped connection metallization coatings 2, 3 provided on mutually opposite ends of said component body 1.

Figure 2:
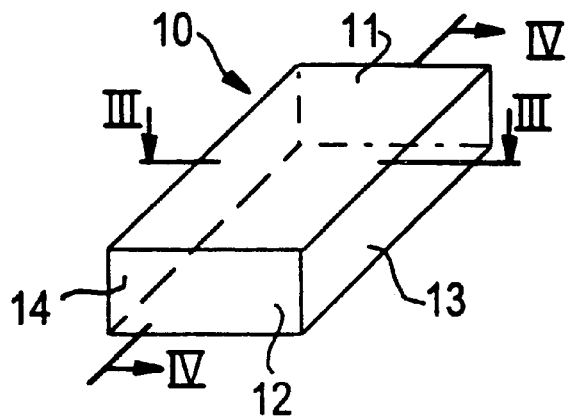
FIG. 2 is a diagrammatic perspective view of a ceramic body as the starting element for the production of components according to the invention.

In accordance with FIG. 2, a parallelepipedal ceramic body 10 is used as the starting element for electroceramic components according to the invention. A protective encapsulation made of two different materials is formed on respective mutually opposite areas 11, 12 and 13, 14 of said ceramic body 10. Therefore, a protective encapsulation according to the invention is bipartite and is formed, in particular, by a laminate 15, 16 on the mutually opposite areas 11, 12 of the ceramic body 10 and by high-resistance layers 17, 18, near the surface, on the mutually opposite areas 13, 14 of the ceramic body 10, as is evident from FIG. 3. In a development of the invention, the laminate 15, 16 may be an insulation material or a high-resistance ceramic which, produced near the surface, corresponds to the ceramic of the ceramic body 10. Appropriate insulation materials for the laminate 15, 16 are, by way of example, $BaTiO_3$, $SiO_2$ or $Al_2O_3$ or glass.

The high-resistance layers 17, 18 near the surface are, preferably, specifically doped layers of the ceramic body 10 itself.

In a method for producing electroceramic components according to the invention, in general terms the component body 10 and the laminate 15, 16 are produced by sheet drawing and the high-resistance layers near the surface are produced by doping with a dopant, preferably the dopant which also serves for realizing the electrical conductivity necessary for the function of the component.

The doping for the purpose of forming the high-resistance layers 17, 18 near the surface can be effected by impregnating the ceramic body 10 with an agent containing the dopant or by application to the ceramic body 10 by means of screen printing, rolling or spraying.

In the case of impregnation, the impregnation agent may be a suspension or solution containing the dopant.

In detail, components according to the invention can be produced as follows.

The following are carried out first of all: sheet drawing of functional ceramic—ceramic body 10 and laminate 15, 16, stacking of the sheets and pressing of the sheet stack with the formation of a green body. This can be done, by way of example, in such a way that a relatively large green body is produced in the format of, for instance, 10×10 cm or sheets which are already subdivided to the size of individual components are stacked and pressed. If a relatively large green body is produced, then subdivision to the size provided for the individual components can be effected after the operations of sheet drawing, stacking and pressing.

Figure 3:
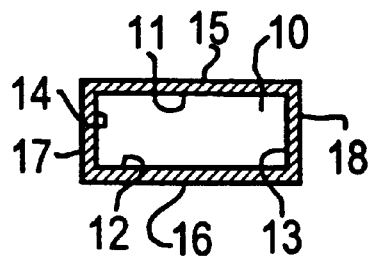
FIG. 3 is a section in a plane III—III with a protective encapsulation according to the invention.
Figure 4:
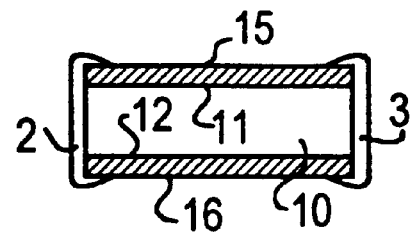
FIG. 4 is a section, corresponding to FIG. 3, in a plane IV—IV in FIG. 2.

Afterwards, the high-resistance layers 17, 18 near the surface are produced on the further mutually opposite areas—13, 14 in FIGS. 2 and 3. In general the doping process is carried out here in such a way that high-resistance or else insulating layers are produced with the necessary penetration depth in the course of a subsequent sintering process.

Finally, the connection metallization coatings 2, 3 are produced in a manner known per se, for example by immersing the component bodies in Ag, AgPd or AgPdPt pastes and subsequent strengthening by electrodeposition, for example by means of Ni and Sn.

Figure 5:
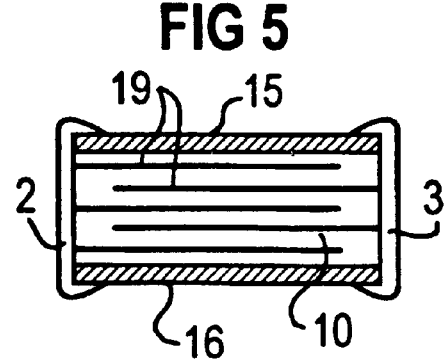
FIG. 5 is an illustration, corresponding to FIG. 4, of an inventive component of the internal electrode type.

The above explanations relate, in conjunction with FIGS. 1 to 4, to electroceramic components having a monolithic component body. However, multilayer components of the internal electrode type can also be produced in a corresponding manner, as is illustrated diagrammatically in FIG. 5, in which elements identical to those in FIGS. 1 to 4 are provided with identical reference symbols. In this case, internal electrodes 19 are embedded in a ceramic body 10 in a manner known per se, it being possible for the component to be produced using multilayer technology.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. An electroceramic component comprising:
   a ceramic component body suitable for SMD mounting, the ceramic body being parallelepiped-shaped and comprising first and second pairs of opposing outer walls and two opposing ends, each opposing end being coated with a connection metallization coating, the first pair of opposing walls being covered with a first protective encapsulation material, the second pair of opposing walls being covered with a second protective encapsulation material.

2. The component of claim 1 wherein the first protective encapsulation material comprises a laminate and the second protective encapsulation material comprises a high-resistance layer.

3. The component of claim 2 wherein the laminate is an insulating material.

4. The component of claim 2 the laminate is selected from the group consisting of $BaTiO_3$, $SiO_2$ and $Al_2O_3$.

5. The component of claim 2 wherein the laminate is glass.

6. The component of claim 2 wherein the laminate is a high-resistance ceramic which is identical to the ceramic of the component body.

7. The component of claim 2 wherein the high-resistance layers covering the second pair of opposing outer walls are doped layers.

8. The component of claim 7 wherein the high-resistance layers each comprise and outer surface, the outer surfaces of the high-resistance layers being doped.

9. A method for producing an electroceramic component comprising the following steps:
   providing a parallelepiped-shaped ceramic component body comprising first and second pairs of opposing outer walls and two opposing ends,
   providing two laminate sheets,
   providing two high-resistance sheets,
   covering each outer wall of the first pair of opposing outer walls with one of the laminate sheets,
   covering each outer wall of the second pair of opposing outer walls one of the high-resistance sheets,
   covering each of the opposing ends of the component with a connection metallization coating.

10. The method of claim 9 further comprising the step of doping the high-resistance sheets near outer surfaces thereof with a conductive dopant.

11. The method of claim 10 wherein the doping of the high-resistance sheets is performed by impregnating the component body with an agent containing the dopant.

12. The method of claim 11 wherein the impregnation agent is a suspension containing the dopant.

13. The method of claim 11 wherein the impregnation agent is a solution containing the dopant.

14. The method of claim 10 wherein the dopant is applied to the component body by screen printing.

15. The method of claim 10 wherein the dopant is applied to the component body by rolling.

16. The method of claim 10 wherein the dopant is applied to the component body by spraying.

17. The method of claim 9 wherein the step of covering each outer wall of the first pair of opposing outer walls with one of the laminate sheets results in a sandwiching of the component body between the two laminate sheets, and prior to the step of covering the second pair of opposing outer walls with the high-resistance sheets, the method further comprises cutting the component body and laminate sheets into at least two individual component bodies.

* * * * *